(12) United States Patent
Tapia

(10) Patent No.: US 12,481,049 B2
(45) Date of Patent: Nov. 25, 2025

(54) HIGH-RESOLUTION POINT CLOUD FORMATION IN AUTOMOTIVE-GRADE RADAR SIGNALS

(71) Applicant: GM Cruise Holdings LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 323 days.

(21) Appl. No.: 17/855,462

(22) Filed: Jun. 30, 2022

(65) Prior Publication Data

US 2024/0004056 A1 Jan. 4, 2024

(51) Int. Cl.
*G01S 13/58* (2006.01)
*G01S 13/50* (2006.01)

(52) U.S. Cl.
CPC .......... *G01S 13/584* (2013.01); *G01S 13/505* (2013.01)

(58) Field of Classification Search
CPC ...... G01S 13/584; G01S 13/505; G01S 13/42; G01S 13/931
See application file for complete search history.

(56) References Cited

U.S. PATENT DOCUMENTS

| | | | |
|---|---|---|---|
| 2003/0210179 A1* | 11/2003 | Dizaji | G01S 7/292 342/194 |
| 2016/0084944 A1* | 3/2016 | Bialer | G01S 7/411 342/70 |
| 2020/0400810 A1* | 12/2020 | Cho | G01S 13/9047 |
| 2021/0116531 A1* | 4/2021 | Shabtay | G06F 18/2431 |
| 2022/0043108 A1* | 2/2022 | Lavian | G01S 7/032 |
| 2022/0120890 A1* | 4/2022 | Roger | G01S 13/584 |
| 2022/0221570 A1* | 7/2022 | Zhu | G01S 7/2883 |
| 2022/0260700 A1* | 8/2022 | Mohta | G01S 13/34 |

* cited by examiner

*Primary Examiner* — Vladimir Magloire
*Assistant Examiner* — Yonghong Li
(74) *Attorney, Agent, or Firm* — CANTOR COLBURN LLP

(57) ABSTRACT

High-resolution point cloud formation based on the use of a point spread function kernel is disclosed. The proposed disclosure provides the means to generate high angular resolution point clouds by performing a matching process of the point spread function (PSF) to a series of adaptive hypotheses to accurately identify the target signatures using the maximum amount of available information. The proposed method comprises a two-stage processing chain. In the first step, the spatial and the Doppler spectrum of the target responses is calculated and decomposed in terms of the sensor point spread function (PSF). In the second step, the target PSF representation is then processed using a support vector machine to determine the presence of closely located targets that would not be possible to detect using typical automotive RADAR signal processing chains.

13 Claims, 14 Drawing Sheets

800

850

HIGH-RESOLUTION POINT CLOUD FORMATION IN AUTOMOTIVE-GRADE RADAR SIGNALS

BACKGROUND

1. Technical Field

The present disclosure generally relates to automotive-grade RADAR signals and, more specifically, to high-resolution point cloud formation using a point spread function kernel.

2. Introduction

An autonomous vehicle (AV) is a motorized vehicle that may navigate without a human driver. An exemplary autonomous vehicle may include various sensors, such as a camera sensor, a light detection and ranging (LIDAR) sensor, and a radio detection and ranging (RADAR) sensor, among others. The sensors collect data and measurements that the autonomous vehicle may use for operations such as navigation. The sensors may provide the data and measurements to an internal computing system of the autonomous vehicle, which may use the data and measurements to control a mechanical system of the autonomous vehicle, such as a vehicle propulsion system, a braking system, or a steering system. Typically, the sensors are mounted at fixed locations on the autonomous vehicles.

AVs are vehicles that are configured to navigate roadways based upon sensor signals output by sensors of the AV, wherein the AV navigates the roadways without input from a human. The AV is configured to identify and track objects (such as vehicles, pedestrians, bicyclists, static objects, and so forth) based upon the sensor signals output by the sensors of the AV and perform driving maneuvers (such as accelerating, decelerating, turning, stopping, etc.) based upon the identified and tracked objects.

The use of automation in the driving of road vehicles such as cars and trucks has increased as a result of advances in sensing technologies (e.g., object detection and location tracking), control algorithms, and data infrastructures. By combining various enabling technologies like adaptive cruise control (ACC), lane keeping assistance (LKA), electronic power assist steering (EPAS), adaptive front steering, parking assistance, anti-lock braking (ABS), traction control, electronic stability control (ESC), blind spot detection, Global Positioning System (GPS) and map databases, vehicle to vehicle communication, and other, it becomes possible to operate a vehicle autonomously (i.e., with little or no intervention by a driver).

In the field of autonomous or quasi-autonomous operation of vehicles such as aircrafts, watercrafts or land vehicles, in particular automobiles, which may be manned or unmanned, sensing the surrounding of the vehicle as well as tracking objects in the surrounding of the vehicle may be considered to be crucial for sophisticated functionalities. These functionalities may range from driver assistance systems in different stages of autonomy up to full autonomous driving of the vehicle.

In certain environments, a plurality of different types of sensors for sensing the surroundings of a vehicle are used, such as monoscopic or stereoscopic cameras, LIDAR sensors, and radio detection and ranging (RADAR) sensors. The different sensor types comprise different characteristics that may be utilized for different tasks.

Embodiments of the present disclosure concern aspects of processing measurement data of RADAR systems, whereby the computationally heavy fusion of sensor data (e.g., range, angle, and velocity) can be mitigated. This is particularly useful, when one parameter array needs to be populated before processing another, such as, range and velocity.

RADAR systems typically provide measurement data, in particular range, Doppler, and/or angle measurements (azimuth and/or elevation), with high precision in a radial direction. This allows one to accurately measure (radial) distances as well as (radial) velocities in a field of view of the RADAR system between different reflection points and the (respective) antenna of the RADAR system.

RADAR systems transmit (emit) RADAR signals into the RADAR system's field of view, wherein the RADAR signals are reflected off of objects that are present in the RADAR system's field of view and received by the RADAR system. The transmission signals are, for instance, frequency-modulated continuous wave (FMCW) signals. Radial distances can be measured by utilizing the time-of-travel of the RADAR signal, wherein radial velocities are measured by utilizing the frequency shift caused by the Doppler effect.

By repeating the transmitting and receiving of the RADAR signals, RADAR systems are able to observe the RADAR system's field of view over time by providing measurement data comprising multiple, in particular consecutive, RADAR frames.

An individual RADAR frame may for instance be a range-azimuth-frame or a range-Doppler-azimuth-frame. A range-Doppler-azimuth-elevation-frame would be also conceivable, if data in the elevation-direction is available.

In each of the multiple RADAR frames a plurality of reflection points which may form clouds of reflection points can be detected. However, the reflection points or point clouds, respectively, in the RADAR frames do not contain a semantic meaning per se. Accordingly, a semantic segmentation of the RADAR frames is necessary in order to evaluate ("understand") the scene of the vehicle's surroundings.

The segmentation of a RADAR frame means that the single reflection points in the individual RADAR frames are assigned a meaning. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

Generally, RADAR systems observe specular reflections of the transmission signals that are emitted from the RADAR system, since the objects to be sensed tend to comprise smoother reflection characteristics than the (modulated) wavelengths of the transmission signals. Consequently, the obtained RADAR frames do not contain continuous regions representing single objects, but rather single prominent reflection points (such as the edge of a bumper), distributed over regions of the RADAR frame.

RADAR data form of 3-dimensional, complex-valued array (a.k.a. RADAR cube) with dimensions corresponding to azimuth (angle), radial velocity (Doppler), and radial distance (range). Taking the magnitude in each angle-Doppler-range bin describes how much energy the RADAR sensor sees coming from that point in space (angle and range) for that radial velocity.

The problem arises from the vast volume of energy data populating the cube. This makes processing the data impermissible in a real-time environment. Some solutions include processing one dimension (i.e., parameter) at a time. However, they are not useful for particular applications, such as 3-d cube processing. Furthermore, previous efforts tend to throw away data which can be useful during object classification. For example, even standard thresholding results in aggressive background removal which could be used in object identification.

Object classification is typically done on the object list where Doppler information is lost. More rich information is obtained by clustering multiple detections as "objects." "Features" are extracted from the object list and classification is performed on the extracted features. Current automotive RADAR point cloud processing forming techniques are a limiting factor in the ability of a RADAR sensor to distinguish closely located targets (both in space and velocity) due to their simplistic detection criteria. Due to limited bandwidth between the RADAR unit and the central computer, it hasn't been feasible to leverage full velocity and position information for classification tasks to distinguish between two objects at a high-resolution.

Features and advantages of the present disclosure will be presented in the description which follows, and in part will become apparent from the description and the accompanying drawings or may be learned by practice of the disclosure according to the teachings provided in the description. Objects as well as other features and advantages of the present disclosure will be realized and attained by an impact simulator particularly pointed out in the Specification in such full, clear, concise, and exact terms as to enable a person having ordinary skill in the art to practice the disclosure.

This overview is intended to provide an overview of subject matter of the present patent application. It is not intended to provide an exclusive or exhaustive explanation of the disclosure. The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

Further limitations and disadvantages of conventional and traditional approaches will become apparent to one of skill in the art, through comparison of such systems with some aspects of the present disclosure as set forth in the remainder of the present application with reference to the drawings. The drawings help demonstrate exemplary methods for object detection in automotive RADAR grade signals and systems. Variations of these circuits, for example, changing the positions of, adding, or removing certain elements from the circuits are not beyond the scope of the present disclosure. The illustrated configurations, and complementary devices are intended to be complementary to the support found in the detailed description.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Current automotive RADAR point cloud processing forming techniques are a limiting factor in the ability of a RADAR sensor to distinguish closely located targets (both in space and velocity) due to their simplistic detection criteria. This is an effect of legacy signal processing techniques used to sense the angle-of-arrival in scenarios with sparse targets (such as aerospace applications) which are not fully suitable for automotive applications. Typically, hardware solutions (such as increasing the sensor antennae effective area) are used to increase the angular resolution of the sensor. This approach results in long development cycles, added cost, and non-optimal use of the information collected by the sensor.

The present disclosure generally relates to Millimeter Wave Sensing, while other wavelengths and applications are not beyond the scope of the disclosure. Specifically, the present method pertains to a sensing technology called FMCW RADARS, which is very popular in automotive and industrial segments. The proposed disclosure provides the means to generate high angular resolution point clouds by performing a matching process of the point spread function (PSF) to a series of adaptive hypotheses to accurately identify the target signatures using the maximum amount of available information.

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Figure 1:
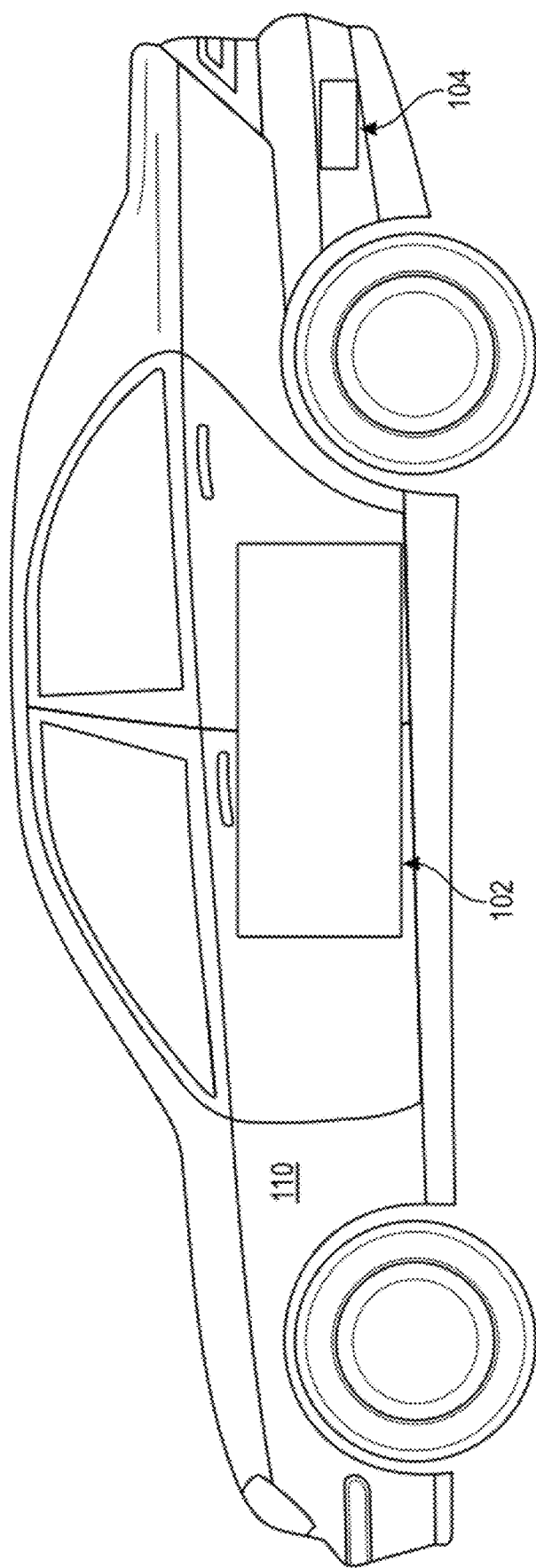
FIG. 1 illustrates an exemplary autonomous vehicle, according to some examples of the present disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, RADAR, sonar, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high-fidelity map. In particular, data from the sensor suite can be used to update a map with information used to develop layers with waypoints identifying selected events, the locations of the encountered events, and the frequency with which the events are encountered at the identified location. In some examples, the events include road hazard data such as locations of potholes or debris. In this way, sensor suite 102 data from many autonomous vehicles can continually provide feedback to the mapping system and the high-fidelity map can be updated as more and more information is gathered.

The sensor suite 102 includes a plurality of sensors and is coupled to the onboard computer 104. In some examples, the onboard computer 104 receives data captured by the sensor suite 102 and utilizes the data received from the sensor suite 102 in controlling operation of the autonomous vehicle 110. In some examples, one or more sensors in the sensor suite 102 are coupled to the vehicle batteries, and capture information regarding a state of charge of the batteries and/or a state of health of the batteries.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view. In some examples, the sensor suite 102 records information relevant to vehicle structural health. In various examples, additional sensors are positioned within the vehicle, and on other surfaces on the vehicle. In some examples, additional sensors are positioned on the vehicle chassis.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2:
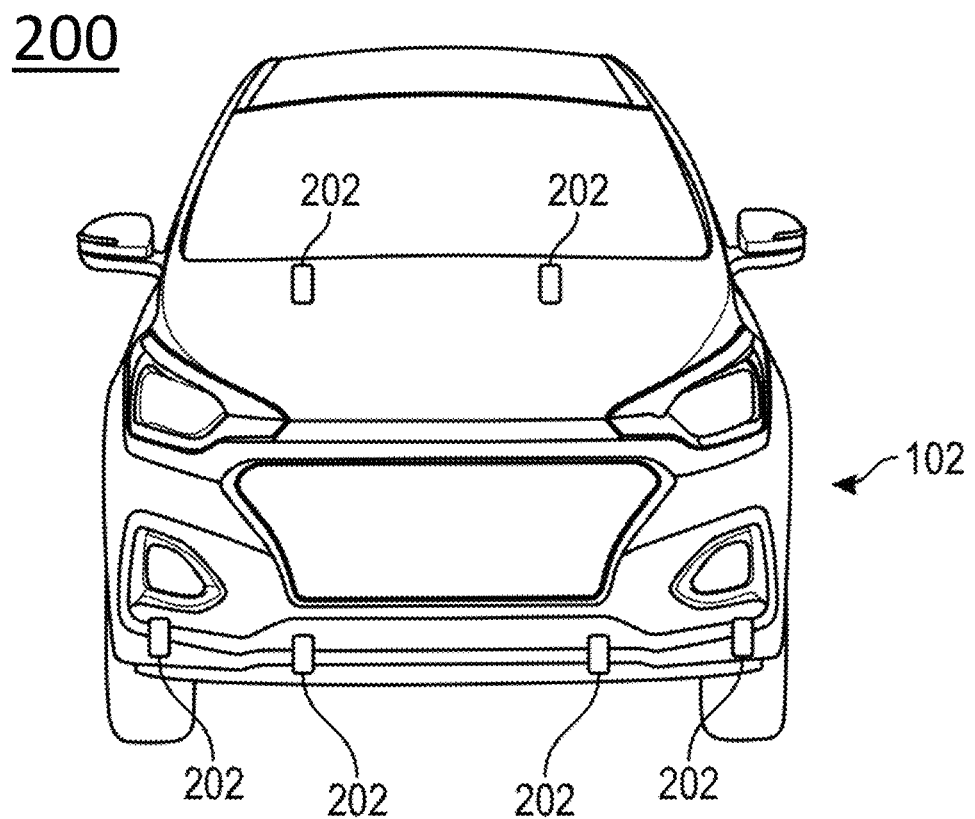
FIG. 2 illustrates an example of a front of an autonomous vehicle having multiple transducers, according to some examples of the present disclosure.

FIG. 2 is a diagram illustrating an example of a front of an autonomous vehicle 200 with multiple spatial systems 202, according to various embodiments of the disclosure. The spatial systems 202 can be positioned underneath the fascia of the vehicle, such that they are not visible from the exterior. In various implementations, more or fewer spatial systems 202 are included on the vehicle 200, and in various implementations, the spatial systems 202 are located in any selected position on or in the vehicle 200. The spatial systems 202 measure structural integrity of the frame and other structural elements of the autonomous vehicle 200, as described above. As described above with respect to the transducers 204 of FIG. 1, in various examples, one or more of the spatial systems 202 are LIDAR devices.

LIDAR is a method for determining ranges (variable distance) by targeting an object with a laser and measuring the time for the reflected light to return to the receiver. LIDAR can also be used to make digital 3-D representations of areas on the earth's surface and ocean bottom, due to differences in laser return times, and by varying laser wavelengths. It has terrestrial, airborne, and mobile applications. LIDAR is an acronym of "light detection and ranging" or "laser imaging, detection, and ranging". LIDAR sometimes is called 3-D laser scanning, a special combination of 3-D scanning and laser scanning.

In other embodiments time-of-flight (ToF) systems, such as a red-green-blue (RGB) camera, can be implemented. A ToF camera is a range imaging camera system employing time-of-flight techniques to resolve distance between the camera and the subject for each point of the image, by measuring the round-trip time of an artificial light signal provided by a laser or a light emitting diode (LED). Laser-based time-of-flight cameras are part of a broader class of scannerless LIDAR, in which the entire scene is captured with each laser pulse, as opposed to point-by-point with a laser beam such as in scanning LIDAR systems. Time-of-flight camera systems can cover ranges of a few centimeters up to several kilometers.

In yet other embodiments, calibration techniques are applicable to optical imaging which uses light and special properties of photons to obtain detailed images. Other applications, such as spectroscopy, are also not beyond the scope of the present disclosure.

In various implementations, additional spatial systems 202 are positioned along the sides of an autonomous vehicle, and at the rear of the autonomous vehicle. These spatial systems 202 may be used as individual devices or collaboratively, as in a plurality of differing types or an array of the same type, such as, a phased array.

Responses among the various spatial systems 202 are used to determine the surrounding environment and moving safely with little or no human input. To that end, sensor suite 102 combines a variety of sensors to perceive vehicle surroundings, such as RADAR, LIDAR, sonar, GPS, odometry, and IMUs. Advanced control systems interpret sensory information to identify appropriate navigation paths, as well as obstacles and relevant signage.

Figure 3:
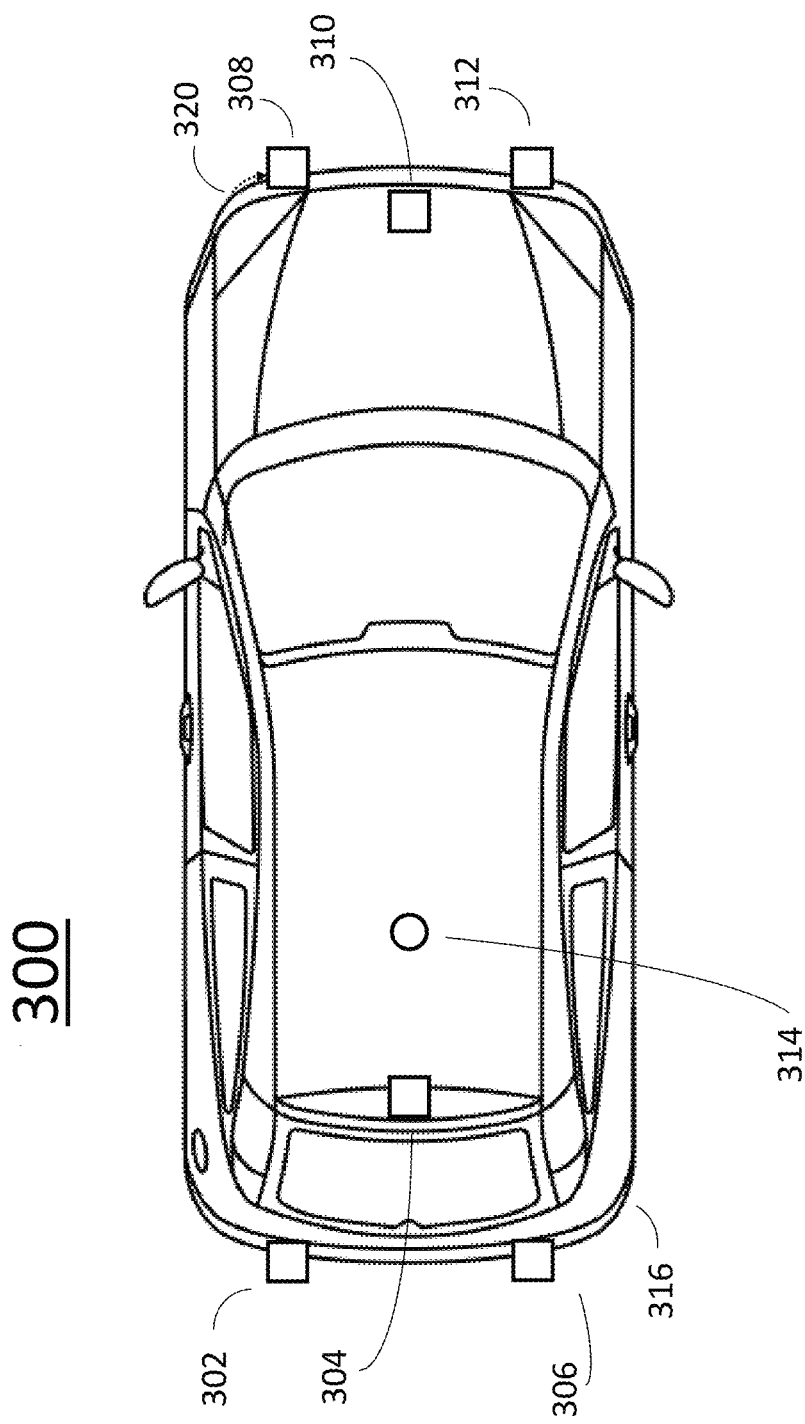
FIG. 3 illustrates an exemplary top-down view of an autonomous vehicle having multiple transducers, according to some examples of the present disclosure.

FIG. 3 illustrates an exemplary top-down view of an autonomous vehicle 300 having multiple antennae, according to some examples of the present disclosure. Front RADAR array 320 comprises antennae 308, 310, and 312. In some embodiments, front RADAR array 320 comprises a phased array and/or multiple-in multiple-out array, the mechanics of which will be discussed in greater detail later in the disclosure. Rear RADAR array 316 comprises antennae 302, 304, and 306. In some embodiments, read RADAR array 316 comprises a phased array and/or multiple-in multiple-out array, the mechanics of which will be discussed in greater detail later in the disclosure. In some embodiments antennae 302, 306, 308, and 312 are configured to measure the relative azimuth of an object, i.e., in a plane parallel to the ground. Whereas, antennae 310, 304 are configured to measure elevation of an object, i.e., in a plane normal to the ground. It can be appreciated that any number of antennae in either direction is not beyond the scope of the present disclosure.

Embodiments of the present disclosure concern aspects of processing measurement data of RADAR systems, whereby the inaccuracies of sensor data (e.g., range, angle, and velocity) can be calibrated. This can be useful, when two or more spatial sensing systems need to be extrinsically calibrated by correlation, in some embodiments. RADAR systems typically provide measurement data, in particular range, Doppler, and/or angle measurements (azimuth and/or elevation), with high precision in a radial direction. This allows one to accurately measure (radial) distances as well as (radial) velocities in a field of view of the RADAR system between different reflection points and the (respective) antenna of the RADAR system.

RADAR systems transmit (emit) RADAR signals into the RADAR system's field of view, wherein the RADAR signals are reflected off of objects that are present in the RADAR system's field of view and received by the RADAR system. The transmission signals are, for instance, FMCW signals. Radial distances can be measured by utilizing the time-of-flight travel of the RADAR signal, wherein radial velocities are measured by utilizing the frequency shift caused by the Doppler effect.

By repeating the transmitting and receiving of the RADAR signals, RADAR systems are able to observe the RADAR system's field of view over time by providing measurement data comprising multiple, in particular consecutive, RADAR frames. An individual RADAR frame may for instance be a range-azimuth-frame or a range-Doppler-azimuth-frame. A range-Doppler-azimuth-elevation-frame would be also conceivable, if data in the elevation-direction is available.

In each of the multiple RADAR frames a plurality of reflection points which may form clouds of reflection points can be detected. However, the reflection points or point clouds, respectively, in the RADAR frames do not contain a semantic meaning per se. Accordingly, a semantic segmentation of the RADAR frames is necessary in order to evaluate ("understand") the scene of the vehicle's surroundings.

The segmentation of a RADAR frame means that the single reflection points in the individual RADAR frames are assigned a meaning. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

Generally, RADAR systems observe specular reflections of the transmission signals that are emitted from the RADAR system, since the objects to be sensed tend to comprise smoother reflection characteristics than the (modulated) wavelengths of the transmission signals. Consequently, the obtained RADAR frames do not contain continuous regions representing single objects, but rather single prominent reflection points (such as the edge of a bumper), distributed over regions of the RADAR frame.

RADAR data form of 3-dimensional, complex-valued array (a.k.a. RADAR cube) with dimensions corresponding to azimuth (angle), radial velocity (Doppler), and radial distance (range). Taking the magnitude in each angle-Doppler-range bin describes how much energy the RADAR sensor sees coming from that point in space (angle and range) for that radial velocity. The mechanics of RADAR cubes will now be discussed in greater detail.

Figure 4:
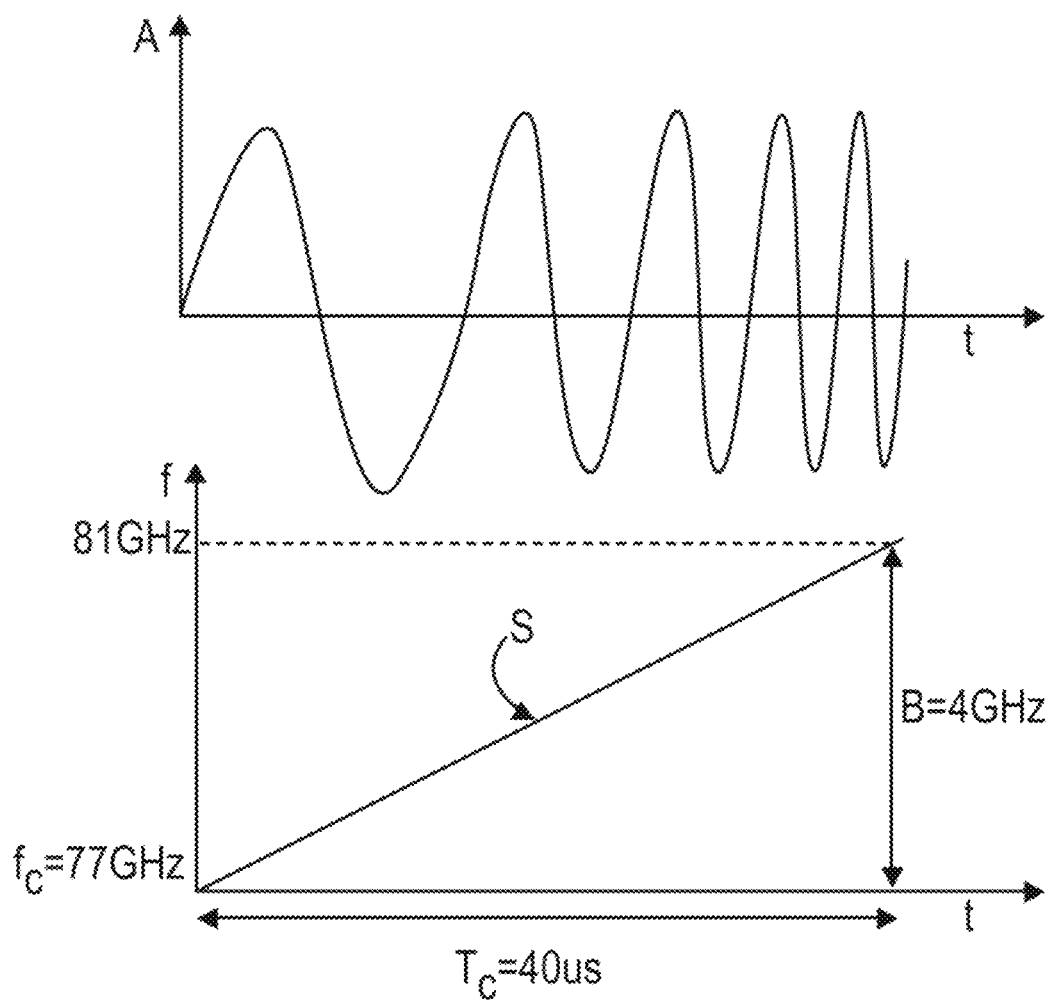
FIG. 4 illustrates an exemplary RADAR chirp as a function of time, according to some examples of the present disclosure.

FMCW RADAR measures the range, velocity, and angle-of-arrival of objects in front of it. At the heart of an FMCW RADAR is a signal called a chirp. FIG. 4 depicts an exemplary RADAR chirp as a function of time 400, according to some embodiments.

A chirp is a sinusoid or a sine wave whose frequency increases linearly with time. FIG. 4 top shows this as an amplitude versus time, or A-t plot. Whereas FIG. 4 bottom, the chirp starts as a sine wave with a frequency of fc and gradually increases its frequency ending up with a frequency of fc plus B, where B is the bandwidth of the chirp. The frequency of the chirp increases linearly with time, linear being the operative word. So, in the f-t plot, the chip would be a straight line with a slope S. Thus, the chirp is a continuous wave whose frequency is linearly modulated. Hence the term frequency-modulated continuous wave or FMCW for short.

Figure 5:
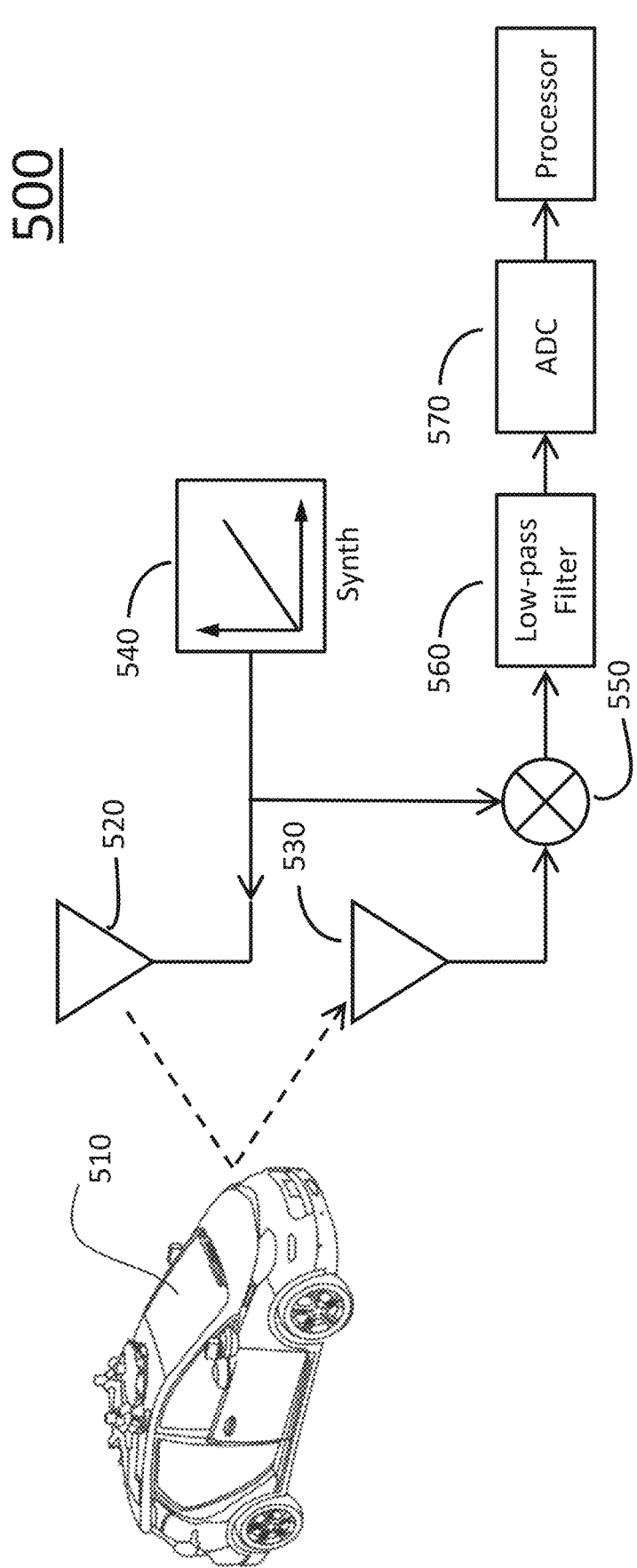
FIG. 5 illustrates an exemplary auto-grade RADAR system, according to some examples of the present disclosure.

FIG. 5 depicts an exemplary automotive-grade RADAR system 500, according to some embodiments. It is represented by a simplified block diagram of an FMCW RADAR with a single TX 520 and a single RX antenna 530. In one or more embodiments, the RADAR operates as follows. A synthesizer 540 generates a chirp. This chirp is transmitted by the TX antenna 520. The chirp is then reflected off an object, such as a car, AV 510, etc. The reflected chirp can then be received at the RX antenna 530. The RX signal and the TX signal are mixed at a mixer 550.

The resultant signal is called an intermediate (IF) signal. The IF signal was prepared for signal processing by low-pass (LP) filtering 560 and sampled using an analog-to-digital converter 570 (ADC). The sampling and conditioning are used as inputs to the method flowchart in FIG. 11, in some embodiments. The significance of the mixer will now be described in greater detail.

Figure 6:
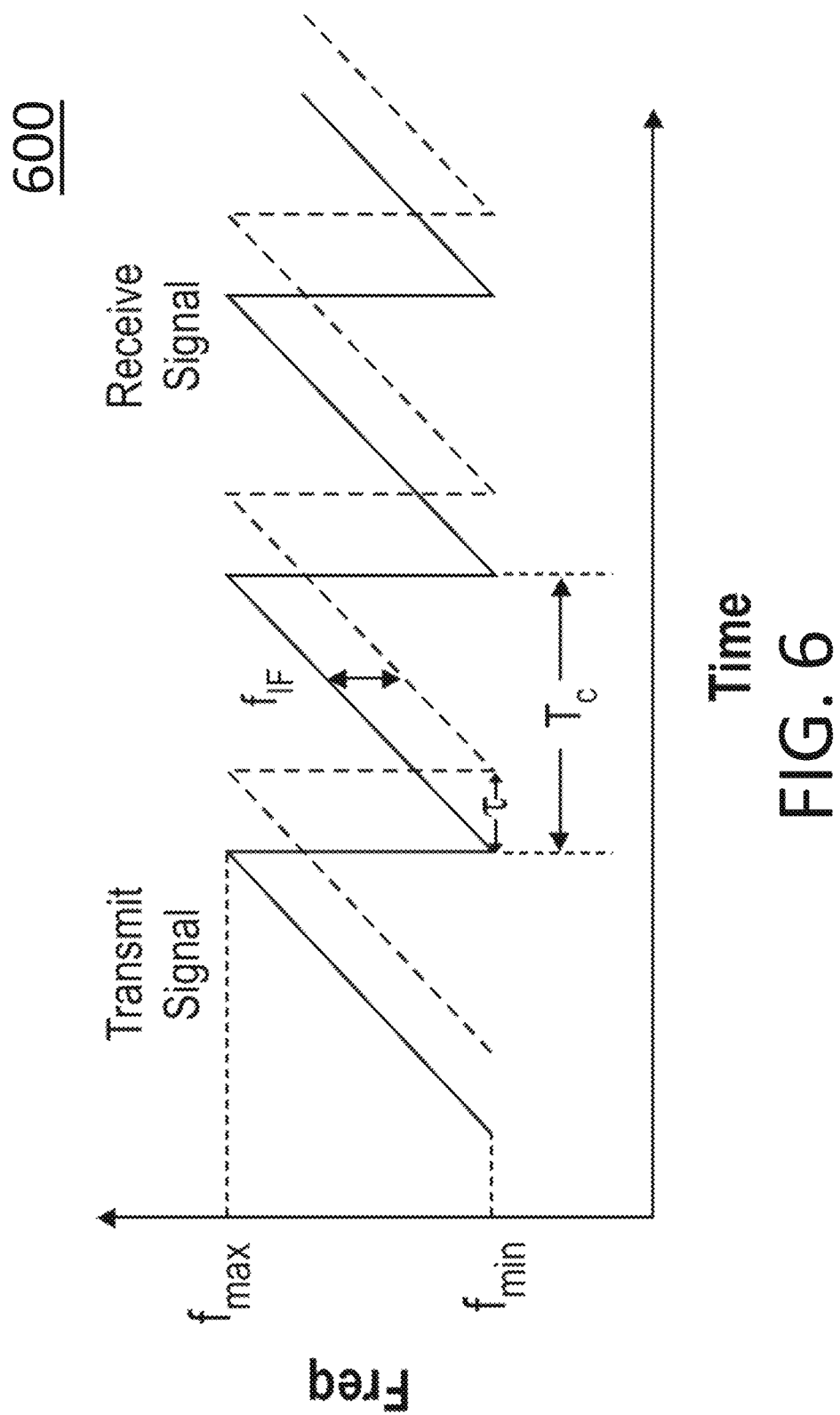
FIG. 6 illustrates the frequency difference in exemplary send and receive RADAR chirps, according to some examples of the present disclosure.

FIG. 6 illustrates the frequency difference in exemplary send and receive RADAR chirps 600, according to some embodiments. In one or more embodiments, this difference is estimated using a mixer. A mixer has two inputs and one output, as is known in the art. If two sinusoids are input to the two input ports of the mixer, the output of the mixer is also sinusoid as described below.

The intermediate frequency, $f_{IF}$, of the output equals the difference of the instantaneous frequencies of the two input sinusoids. So, the frequency of the output at any point in time would be equal to the difference of the input frequencies of two time-varying sinusoids at that point in time. Tau, τ, represents the round-trip delay from the RADAR to the object and back in time. It can also be expressed as twice the distance to the object divided by the speed of light. A single object in front of the RADAR produces an IF signal with a constant frequency of $f_{IF}$ and calculated by S2d/c. The time delay and intermediate frequency are used to calculate range-Doppler mapping 1108 in FIG. 11, according to some embodiments.

Figure 9:
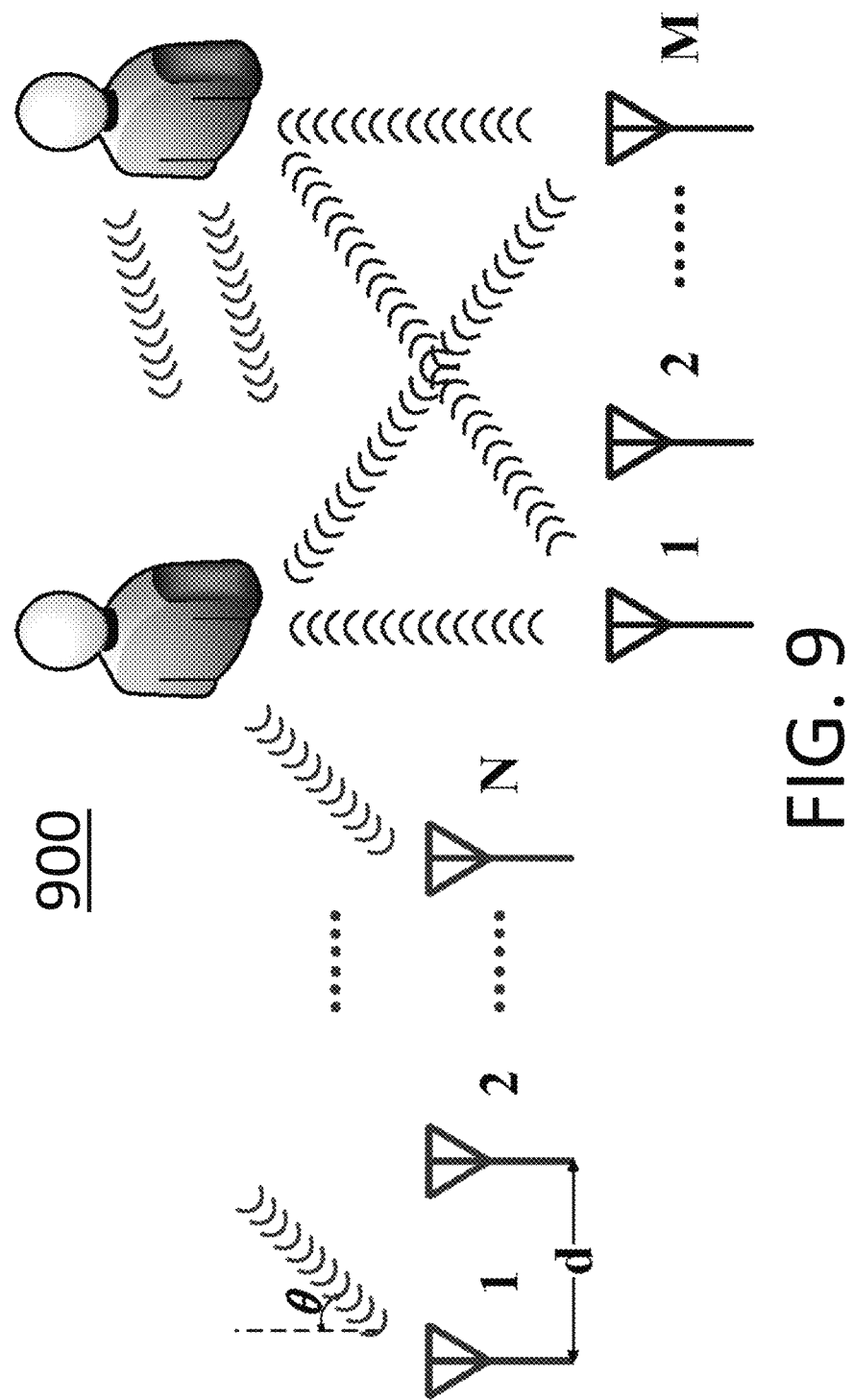
FIG. 9 illustrates an exemplary antenna array used to calculate angle, according to some examples of the present disclosure.

In some embodiments, the transmitted signal utilizes a FMCW-MIMO mm-wave RADAR. MIMO stands for massive input massive output. A chirp signal is the FMCW signal in a cycle Tc. In each chirp signal, the RADAR uses the Time-Division Multiplexing (TDM) MIMO Angle-Of-Arrival (AOA) estimation algorithm to increase the angular resolution by M transmit antennae and N receive antennae, as shown in FIG. 9 which will be discussed later in the disclosure.

Figure 7:
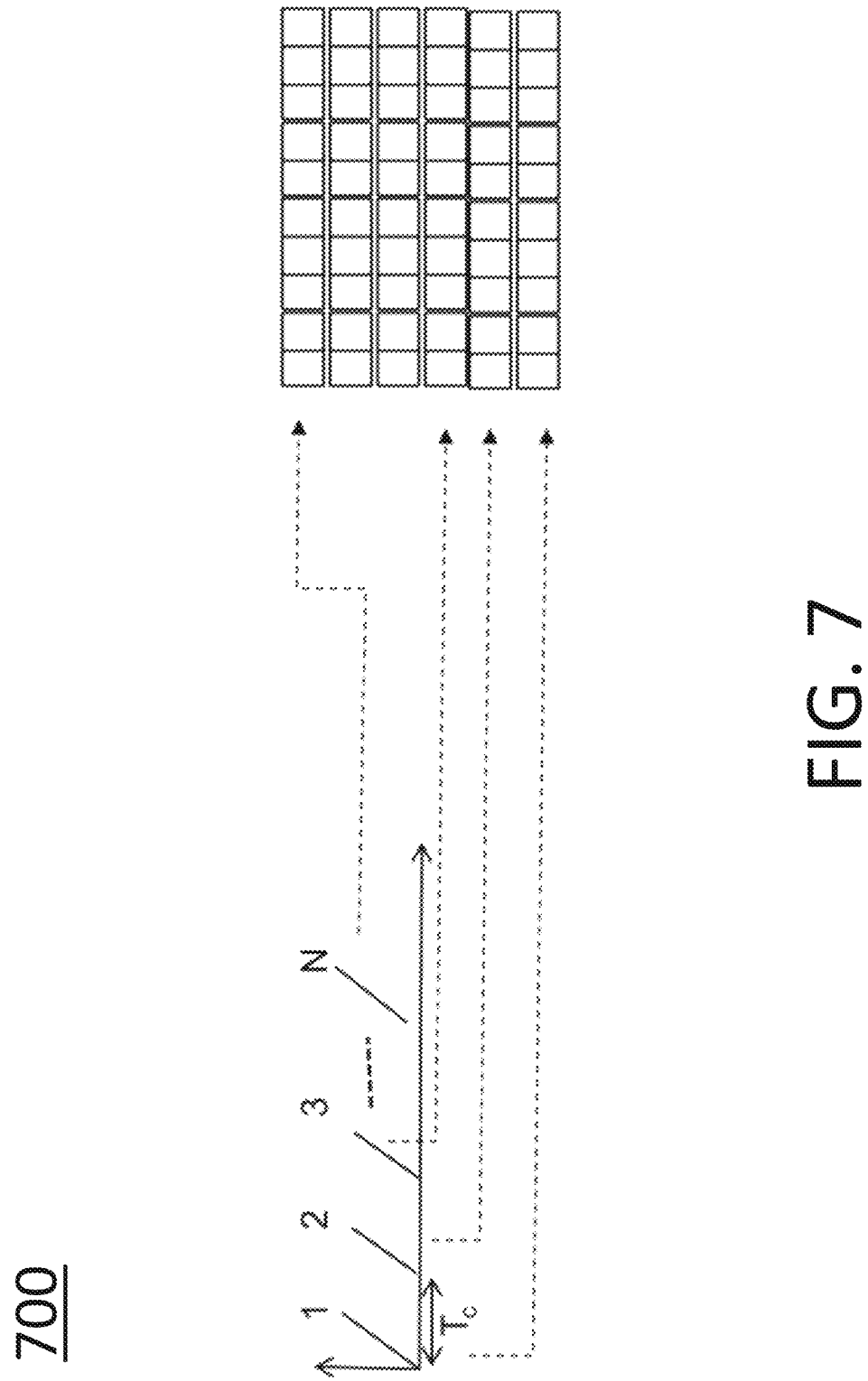
FIG. 7 illustrates an exemplary two-dimensional range array being populated, according to some examples of the present disclosure.

FIG. 7 illustrates an exemplary two range matrix being populated by a RADAR frame, according to some embodiments. A RADAR frame (left) has a time TF and comprises a plurality of chirps, 1-N, each separated in time by Tc. Each row corresponds to one chirp. That is, for every chirp there is a row in the chirp index, i.e., N rows for N chirps. Each box in a particular row represents one ADC sample. Accordingly, if each chirp is sample M times, there will be M columns in the matrix. The transformation of the data matrix in range and velocity matrices will now be described.

Figure 8A:
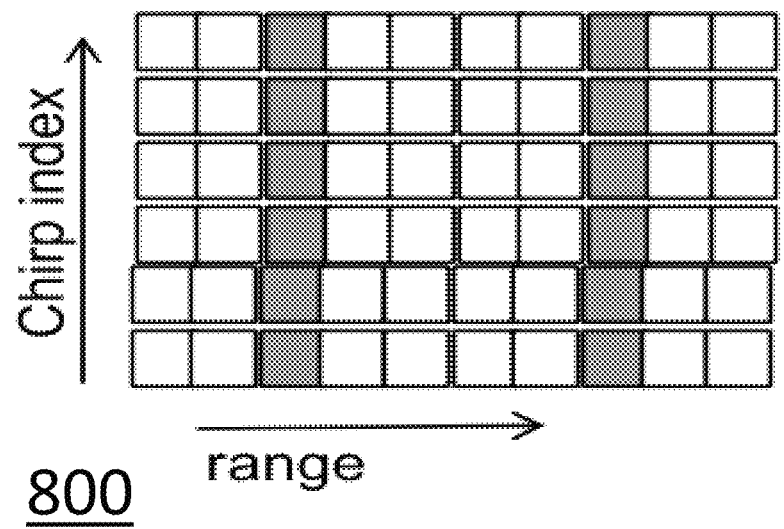
FIGS. 8A-B illustrate the creation of a velocity-range array from a chirp index-range array, according to some examples of the present disclosure.

FIG. 8A illustrates the creation of a chirp-range matrix 800 from the previous data matrix, according to some embodiments. As mentioned above, each row corresponds to samples from a specific chirp. To determine range(s), a range-fast Fourier transform (FFT) is performed on each row. An FFT is an algorithm that computes the discrete Fourier transform (DFT) of a sequence, or its inverse (IDFT). Fourier analysis converts a signal from its original domain (often time or space) to a representation in the frequency domain and vice versa.

The application of the range-FFT resolves objects in range. As one skilled in the art can appreciate, the x-axis is actually the frequency corresponding to the range-FFT bins. But, since range is proportional to the IF frequency, this can be plotted directly as the range axis. Therefore, FIG. 5A is a matrix of chirps with each chirp having an array of frequency bins. Pursuant to the discussion above, these bins correspond directly to the range via the IF.

Figure 8B:
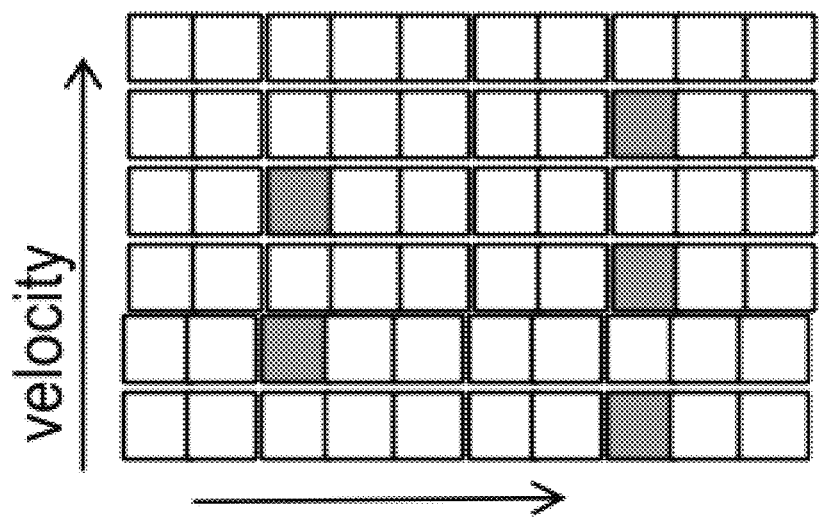

FIG. 8B illustrates the creation of a velocity-range matrix from the previous chirp index-range matrix, according to some embodiments. A Doppler-FFT is performed along the columns of these range-FFT results shown in FIG. 8B. This resolves objects in the velocity dimension. As can be appreciated, FIG. 8B depicts two objects in the third range bin traveling at two different speeds. Similarly, there are three objects in the eight-range bin traveling at three different speeds. It should be noted that these are accurate for a fixed range-angle. Angle determination will now be discussed in greater detail.

FIG. 9 illustrates exemplary antenna arrays 900 used to calculate angle, according to some examples of the present disclosure. Angle estimation requires at least two receiver (RX) antennae. The differential distance of the object to each of these antennae is exploited to estimate distance. So, the transmit (TX) antenna array 1-M transmits a signal that is a chirp. It is reflected off the objects with one ray going from the object to the first RX antenna and another ray going from the object to the second RX antenna.

In this example depicted in FIG. 9, the ray to the RX antenna 1 has to travel a little longer than to the RX antenna 2. That is, an additional distance of delta d. This additional distance results in an additional phase of omega equal to 2 pi delta d by lambda. So, this is the phase difference between the signal at this antenna and the signal at this antenna. Phase differences are used in the angular spectrum calculation 1110 of FIG. 11, in some embodiments.

Figure 10A:
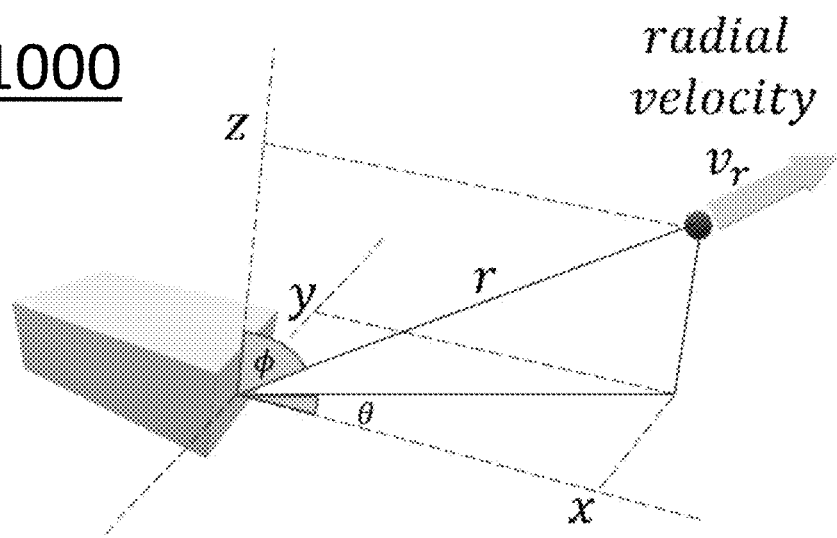
FIG. 10A illustrates an exemplary antenna array used to calculate radial velocity, according to some examples of the present disclosure.

FIG. 10A illustrates an exemplary antenna array used to calculate radial velocity, according to some examples of the present disclosure. FIG. 10A depicts an exemplary schematic of the MIMO RADAR system, in accordance with some embodiments of the disclosure provided herein. As previously discussed, the MIMO RADAR system is made up of multiple antennae, used to obtain range, angle, and velocity resolution.

Figure 10B:
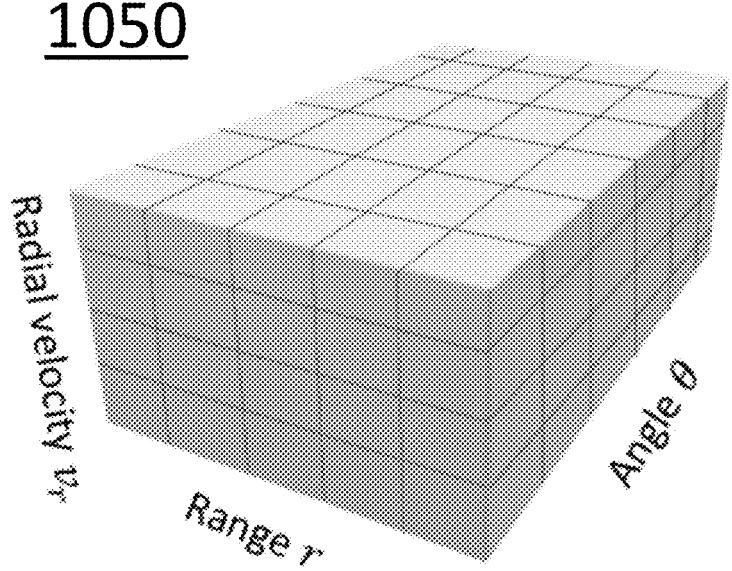
FIG. 10B illustrates an exemplary range, angle velocity data cube, according to some examples of the present disclosure.

As can be appreciated in association with FIG. 10B, FIG. 10A illustrates an exemplary coordinate system schematic surrounding a MIMO RADAR system, in accordance with some embodiments of the disclosure provided herein. One may choose a coordinate system where the x axis is pointing outward from the system, the y axis is point to the left from the point of view of an observer looking out from the system, and the z axis is pointing upwards. The angle ϕ is measured with respect to the z axis. The angle 90°-ϕ is commonly referred to as the elevation angle.

A combination of processing from a particular configuration of antennae and encasing of the system may reduce the angles ϕ from which the system receives signals. For example, the objects from which the system receives signal may be restricted to be at positions whose angle ϕ are near π/2, or equivalently such that the elevation angle is small.

A single MIMO RADAR system may be able to resolve the radial velocity $v_r$ of objects, which is the velocity pointing outwards with respect to the system. It may also use the signal from multiple antennae to resolve the azimuthal angle θ. One could deploy two MIMO RADAR systems in different locations, so that each system outputs a radial velocity with respect to its position, from which one can resolve more coordinates of the velocity vector. Coherent processing of data from multiple RADARs could be performed from cooperating RADARs.

FIG. 10B depicts an exemplary RADAR cube, in accordance to one or more embodiments. Employing schemes such as FMCW, one can resolve the distance and velocity of objects in the scene. What is obtained for such schemes is sometimes called the RADAR cube, as the system outputs measured RADAR signals in three dimensions: range, angle, and velocity. For each range, angle, and velocity bin, a FMCW-MIMO RADAR system may output an amplitude and phase. FIG. 10B is illustrative of RADAR cube point cloud population 1122 of FIG. 11.

If the angle ϕ is restricted to be near π/2, the system may be approximated to receive data from a two-dimensional plane. FIG. 10B depicts a RADAR cube, which is populated with amplitudes and phases for values of range r, azimuthal angle θ, and radial velocity $v_r$. A coordinate system of x and y coordinates may be defined such that for an object with range r, angle θ, the coordinates are defined as:

$$x = r\cos(\theta)$$

$$y = r\sin(\theta)$$

The radial velocity is defined as the change in the radial distance over time:

$$v_r = \frac{d}{dt}r.$$

Turning back to FIG. 10A, a bird's eye view of the coordinate system around the detection device in this arbitrary choice includes the x axis points outwards, and y axis points up, from the bird's eye view. The angle θ is measured with respect to the x axis. Using multiple antennae, a MIMO RADAR may resolve the angle θ, giving a set of RADAR bins. Using a measurement scheme such as an FMCW scheme, it may also resolve range and radial velocity.

During the detection step, a set of points or point clouds are generated. From these, a threshold value can be determined. In other embodiments, the threshold value is already predetermined.

Figure 11:
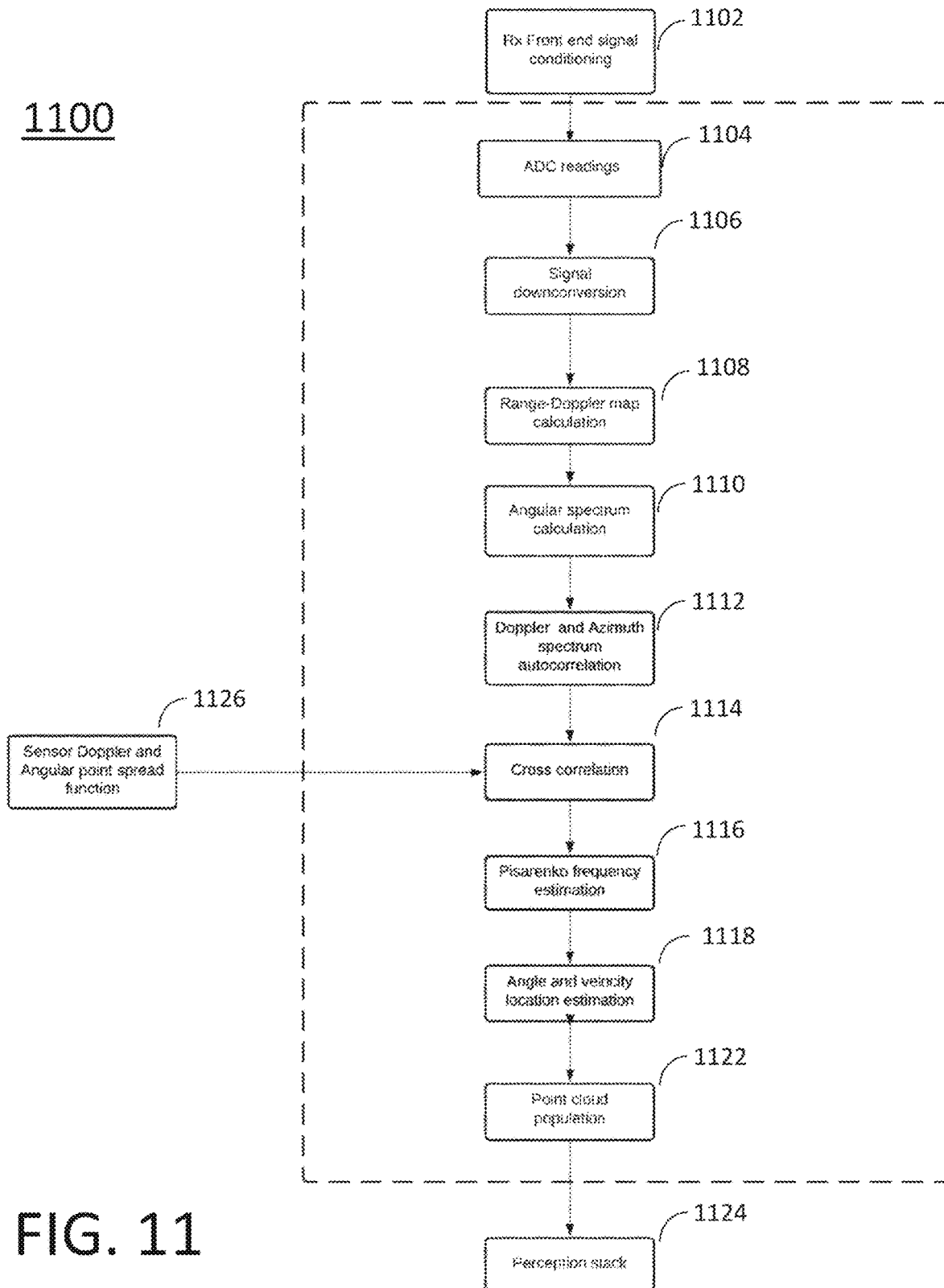
FIG. 11 illustrates an exemplary method for the formation of a high-resolution point cloud, according to some examples of the present disclosure.

FIG. 11 illustrates an exemplary method 1100 for the formation of a high-resolution point cloud, according to some examples of the present disclosure. In one or more embodiments, transducer signals are read from the sensors. In the present embodiment, the transducers are RADAR antennae, yet any other sensor is not beyond the scope of the present disclosure. These readings are typically in an analog state. As such, they can be sampled in an ADC.

In electronics, an ADC is a system that converts an analog signal, such as a sound picked up by a microphone or light entering a digital camera, into a digital signal. An ADC may also provide an isolated measurement such as an electronic device that converts an analog input voltage or current to a digital number representing the magnitude of the voltage or current. Typically, the digital output is a two's complement binary number that is proportional to the input, but other numbering systems remain in the scope of the present disclosure.

The receiver (Rx) signals are signal conditioned 1102 at the front end which includes amplification. Specifically, the received RADAR echoes from a scan area are processed by at least one of the sensors radio frequency (RF) front end elements. In other embodiments, received RADAR echoes from a scan area are processed by each one of the sensors RF front end elements.

The processed Rx responses are then sampled in the ADC 1104 and down-converted 1106. In some embodiments, the Rx frequency is RF in the Gigahertz regime, although other suitable bandwidths and/or electromagnetic spectra are not beyond the scope of the present disclosure. Accordingly, there is a computationally excessive amount of data in order to satisfy the Nyquist rate. In signal processing, the Nyquist rate, named after Harry Nyquist, specifies a sampling rate (in units of samples per second or hertz, Hz) equal to twice the highest frequency (bandwidth) of a given function or signal. With an equal or higher sampling rate, the resulting discrete-time sequence is said to be free of the distortion known as aliasing. Conversely, for a given sample rate, the corresponding Nyquist frequency in Hz is the largest bandwidth that can be sampled without aliasing, and its value is one-half the sample rate. Note that the Nyquist rate is a property of a continuous-time signal, whereas Nyquist frequency is a property of a discrete-time system.

The range-Doppler map of the recorded signals is then calculated 1108, as previously described. The azimuth spectrum of the range-Doppler map is also calculated 1110. While in the present method, these are represented by pipelined steps, many steps are not precluded from being processed in a parallel computation/architecture.

Foreground extraction can be performed by various methods for suppressing noise and artifacts and extracting salient regions of a RADAR cube. Most, if not all, involve estimating either a background model and somehow removing it or creating a mask that emphasizes desired bins and suppresses others through element-wise multiplication.

An adaptive threshold in the range-Doppler map is applied to extract the signatures of the most relevant targets in the scene. In some embodiments, target signatures are identified during classification. As is known in the art, classification can be thought of as the question and answer to the question, "What is each object?" Typically, the perception stack comprises classification, tracking and clustering. In some embodiments, a predetermined signature is used to facilitate an identification of objects. For example, previous scans of motorcycles and cars, juxtaposed and/or separated, could be used to identify an object in a scene. This would lessen the computation burden during classification. Of course, predetermined scanned objects are not just limited to motorized vehicles, as any common object is not beyond the scope of the present disclosure.

In other embodiments, thresholding is used to identify objects. CFAR Constant False Alarm Rate (CFAR) thresholding is probably the most well-known and well-studied technique and involves estimating a background model through local averaging. CFAR detection refers to a common form of adaptive algorithm used in RADAR systems to detect target returns against a background of noise, clutter, and interference.

The primary idea is that noise statistics may be non-uniform across the array. CA-CFAR (cell averaging) computes a moving mean while excluding a region at the center of the averaging window (guard cells) to avoid including a desired object in the background estimate. OS-CFAR (order-statistic) does the same computation but with a percentile operation instead of a mean.

The angular (azimuth and elevation) spectrum of each one of the extracted objects (e.g., targets) is calculated 1110. The autocorrelation of the target signatures is calculated in the Doppler and angular directions 1112. This results in autocorrelation matrices for the two (or more in some embodiments) vectors.

Autocorrelation, sometimes known as serial correlation in the discrete-time case, is the correlation of a signal with a delayed copy of itself as a function of delay. Informally, it is the similarity between observations as a function of the time lag between them. The analysis of autocorrelation is a mathematical tool for finding repeating patterns, such as the presence of a periodic signal obscured by noise, or identifying the missing fundamental frequency in a signal implied by its harmonic frequencies. It is often used in signal processing for analyzing functions or series of values, such as time domain signals.

The (potentially time-dependent) autocorrelation matrix (also called second moment) of a (potentially time-dependent) random vector $X=(X_1, \ldots, X_n)^T$ is an n×n matrix containing as elements the autocorrelations of all pairs of elements of the random vector X. The autocorrelation matrix is used in various digital signal processing algorithms.

In practice before roll-out, sensors are intrinsically calibrated. That is, the AV is disposed in a predetermined scene, wherein the one or sensor systems can be calibrated, sometimes with each other's. On sensor calibration, the angular and Doppler point spread function will be determined and its spectrum representation will be characterized and stored in sensor's memory. This can be thought of as the first stage of a two-stage processing chain, although the chronology of which is not important. In the present embodiment, the first stage comprises determining a PSF and decomposing the spatial and the Doppler spectrum 1126. In some embodiments, this is performed during the calibration of predetermined target responses.

The PSF describes the response of an imaging system to a point source or point object. A more general term for the PSF is a system's impulse response, the PSF being the impulse response of a focused optical system. The PSF in many contexts can be thought of as the extended blob in an image that represents a single point object. In functional terms, it is the spatial domain version of the optical transfer function of the imaging system. It is a useful concept in Fourier optics, astronomical imaging, medical imaging, electron microscopy and other imaging techniques such as 3D microscopy (like in confocal laser scanning microscopy) and fluorescence microscopy.

The degree of spreading (blurring) of the point object is a measure for the quality of an imaging system. In non-coherent imaging systems, such as fluorescent microscopes, telescopes or optical microscopes, the image formation process is linear in the image intensity and described by linear system theory. This means that when two objects A and B are imaged simultaneously, the resulting image is equal to the sum of the independently imaged objects. In other words: the imaging of A is unaffected by the imaging of B and vice versa, owing to the non-interacting property of photons. In space-invariant systems, i.e. those in which the PSF is the same everywhere in the imaging space, the image of a complex object is then the convolution of the true object and the PSF. The PSF can be derived from diffraction integrals.

Next, a cross correlation of the autocorrelation matrices and the sensor point spread function is calculated 1114. In 1116, a Pisarenko method is used to estimate the Doppler and angular offsets from the resultant cross correlation of 1114. Pisarenko harmonic decomposition, also referred to as Pisarenko's method, is a method of frequency estimation. This method assumes that a signal, x(n), consists of p complex exponentials in the presence of white noise. Because the number of complex exponentials must be known a priori, it is somewhat limited in its usefulness.

Pisarenko's method also assumes that p+1 values of the M×M autocorrelation matrix are either known or estimated. Hence, given the (p+1)×(p+1) autocorrelation matrix, the $$V_{min}(z) = \sum_{k=0}^{p} v_{min}(k) z^{-k}$$

dimension of the noise subspace is equal to one and is spanned by the eigenvector corresponding to the minimum eigenvalue. This eigenvector is orthogonal to each of the signal vectors. The frequency estimates may be determined by setting the frequencies equal to the angles of the roots of the polynomial:

or the location of the peaks in the frequency estimation function (or the pseudo-spectrum):

$$\hat{P}_{PHD}(e^{j\omega}) = \frac{1}{|e^H v_{min}|^2},$$

where $v_{min}$ is the noise eigenvector and $$e=[1e^{j\omega}e^{j2\omega} \ldots e^{j(M-1)\omega}]^T.$$

The Pisarenko step 1116 results in angle and velocity location estimations 1118. These are then populated into a point cloud 1122 and reported to a perception stack 1124. The purpose of the perception stack is to provide information about the dynamic objects and stationary obstacles. In one or more embodiments, a perception stack is implemented in software and is responsible for object detection, classification and tracking, obstacle detection and classification, and drivable area estimation based at least on sensor information.

In some embodiments, the target PSF representation is then processed using a support vector machine to determine the presence of closely located targets that would not be possible to detect using typical automotive RADAR signal processing chains. In machine learning, support vector machines (SVMs, also support vector networks) are supervised learning models with associated learning algorithms that analyze data for classification and regression analysis. SVMs are one of the most robust prediction methods, being based on statistical learning frameworks or VC theory. Given a set of training examples, each marked as belonging to one of two categories, an SVM training algorithm builds a model that assigns new examples to one category or the other, making it a non-probabilistic binary linear classifier (although methods such as Platt scaling exist to use SVM in a probabilistic classification setting). SVM maps training examples to points in space so as to maximize the width of the gap between the two categories. New examples are then mapped into that same space and predicted to belong to a category based on which side of the gap they fall.

In addition to performing linear classification, SVMs can efficiently perform a non-linear classification using what is called the kernel trick, implicitly mapping their inputs into high-dimensional feature spaces.

To one skilled in the art, the following advantages are present. The proposed method makes maximum use of sensor information. Since the process is performed at the lowest possible signal level, all available target information is used to form a high-resolution point cloud in a single collection cycle (which minimizes latency). This is considerably different to the approach followed by some of current techniques, which rely on multiple cycle information and point cloud level post processing.

Additionally, the present disclosure gives rise to contrast maximization. By performing the target decomposition using the sensor point spread function, the inherent noise characteristics of the sensor are taken into account. This behavior allows the proposed disclosure to better discriminate between noise and low magnitude target responses.

Furthermore, the present disclosure enhances angular and velocity (Doppler) discrimination capabilities. Compared with standard signal processing methods the presence of two closely located targets can be more easily determined using the proposed approach. This is due to the fact that the inherent sensor response is used to determine the presence and location of the targets, unlike current signal processing methods that use generic kernels for the same goal. The use of the inherent signal response results in a higher detection accuracy and less processing related artifacts as the sensor behavior is already incorporated into the processing chain.

Figure 12:
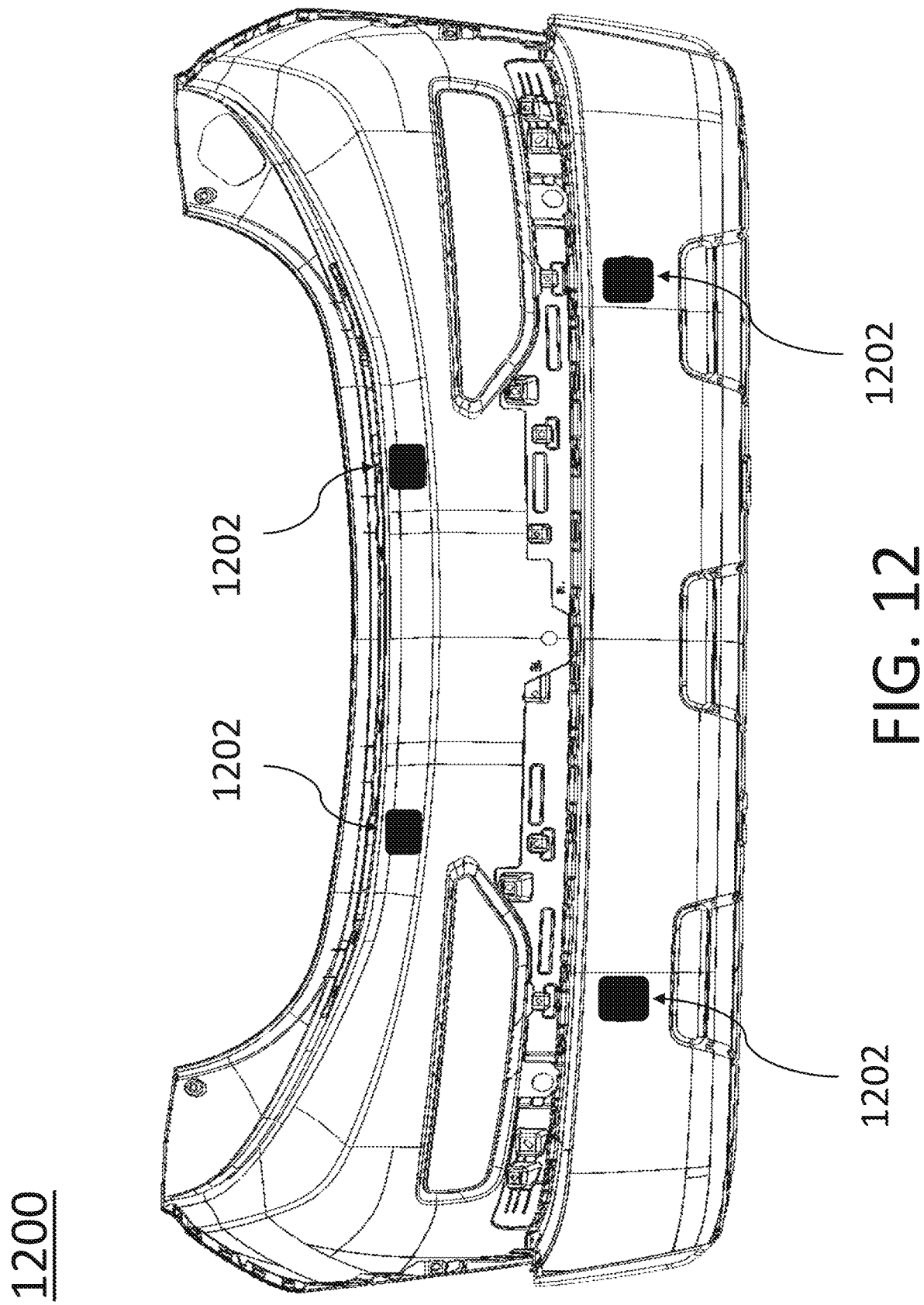
FIG. 12 illustrates a diagram example of a rear of an autonomous, vehicle having multiple transducers, according to some examples of the present disclosure.

FIG. 12 illustrates a diagram example of a rear of an autonomous vehicle 1200 having multiple transducers, according to some examples of the present disclosure. The transducers 1202 are positioned underneath the fascia of the vehicle, such that they are not visible from the exterior. In various implementations, more or fewer transducers 1202 are included on the vehicle 1200, and in various implementations, the transducers 1202 are located in any selected position on or in the vehicle 1200. The transducers 1202 are positioned and designed to detect objects and target signatures disposed around the autonomous vehicle 300. As described above with respect to the spatial systems 202 of FIG. 2, in various examples, one or more of the transducers 1202 are electromagnetic antennae, but other sensors, such as, piezoelectric transducers, multi-axis piezoelectric transducers, accelerometers, multi-axis accelerometers, microphones are not beyond the scope of the present disclosure.

In various implementations, additional transducers 1202 are positioned along the sides of an autonomous vehicle. Also, in some examples, additional transducers 1202 are positioned at the rear of the autonomous vehicle. These transducers may also be positioned underneath the fascia of the vehicle. A subset of transducers may be placed on the suspension, or the main vehicle inertial measurement unit may be used in order to determine whether the source of acceleration is the suspension, or drive train, based on time delays of correlated acceleration waveforms.

Figure 13:
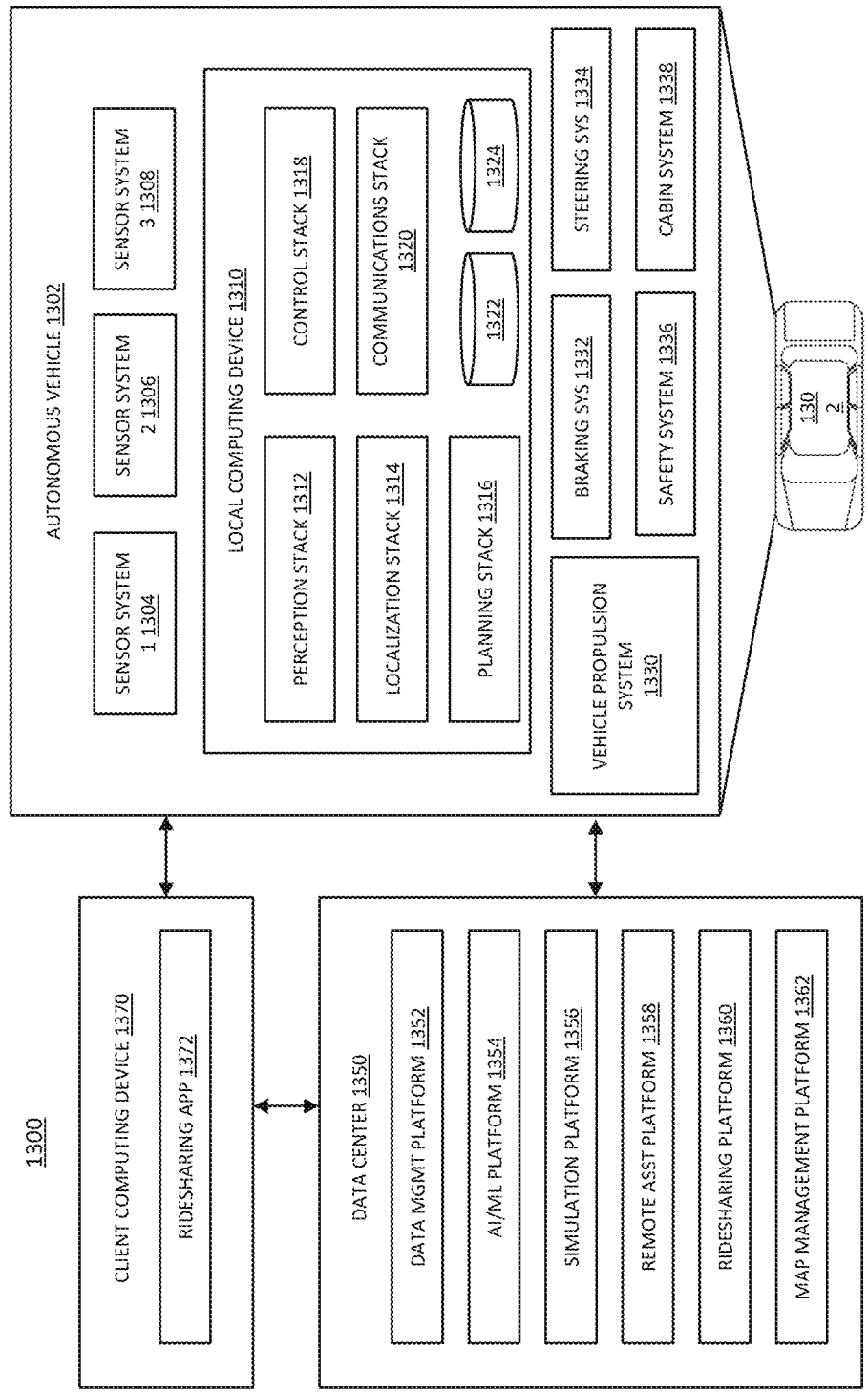
FIG. 13 illustrates an example of a deep learning neural network that may be used to implement a perception module and/or one or more validation modules, according to some aspects of the disclosed technology.

FIG. 13 illustrates an example of a deep learning neural network that may be used to implement a perception module and/or one or more validation modules, according to some aspects of the disclosed technology. Turning now to FIG. 13, this figure illustrates an example of an AV management system 1300. One of ordinary skill in the art will understand that, for the AV management system 1300 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1300 includes an AV 1302, a data center 1350, and a client computing device 1370. The AV 1302, the data center 1350, and the client computing device 1370 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud, or hybrid cloud network, etc.).

In some embodiments, the various sensor systems, 1304, 1306, 1308 can be RADAR arrays which are sampled and functioned as inputs to ADC reading 1102 of FIG. 11. In other embodiments, the perception stack of 1312 is the egress of the flowchart of FIG. 11. That is, the point could population of 1122 functions as inputs to perception stack 1124.

AV 1302 may navigate about roadways without a human driver based on sensor signals generated by multiple sensor systems 1304, 1306, and 1308. The sensor systems 1304-1308 may include different types of sensors and may be arranged about the AV 1302. For instance, the sensor systems 1304-1308 may comprise IUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1304 may be a camera system, the sensor system 1306 may be a LIDAR system, and the sensor system 1308 may be a RADAR system. Other embodiments may include any other number and type of sensors.

AV 1302 may also include several mechanical systems that may be used to maneuver or operate AV 1302. For instance, the mechanical systems may include vehicle propulsion system 1330, braking system 1332, steering system 1334, safety system 1336, and cabin system 1338, among other systems. Vehicle propulsion system 1330 may include an electric motor, an internal combustion engine, or both. The braking system 1332 may include an engine brake, a wheel braking system (e.g., a disc braking system that utilizes brake pads), hydraulics, actuators, and/or any other suitable componentry configured to assist in decelerating AV 1302. The steering system 1334 may include suitable componentry configured to control the direction of movement of the AV 1302 during navigation. Safety system 1336 may include lights and signal indicators, a parking brake, airbags, and so forth. The cabin system 1338 may include cabin temperature control systems, in-cabin entertainment systems, and so forth. In some embodiments, the AV 1302 may not include human driver actuators (e.g., steering wheel, handbrake, foot brake pedal, foot accelerator pedal, turn signal lever, window wipers, etc.) for controlling the AV 1302. Instead, the cabin system 1338 may include one or more client interfaces (e.g., Graphical User Interfaces (GUIs), Voice User Interfaces (VUIs), etc.) for controlling certain aspects of the mechanical systems 1330-1338.

AV 1302 may additionally include a local computing device 1310 that is in communication with the sensor systems 1304-1308, the mechanical systems 1330-1338, the data center 1350, and the client computing device 1370, among other systems. The local computing device 1310 may include one or more processors and memory, including instructions that may be executed by the one or more processors. The instructions may make up one or more software stacks or components responsible for controlling the AV 1302; communicating with the data center 1350, the client computing device 1370, and other systems; receiving inputs from riders, passengers, and other entities within the AV's environment; logging metrics collected by the sensor systems 1304-1308; and so forth. In this example, the local computing device 1310 includes a perception stack 1312, a mapping and localization stack 1314, a planning stack 1316, a control stack 1318, a communications stack 1320, a High Definition (HD) geospatial database 1322, and an AV operational database 1324, among other stacks and systems.

Perception stack 1312 may enable the AV 1302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1304-1308, the mapping and localization stack 1314, the HD geospatial database 1322, other components of the AV, and other data sources (e.g., the data center 1350, the client computing device 1370, third-party data sources, etc.). The perception stack 1312 may detect and classify objects and determine their current and predicted locations, speeds, directions, and the like. In addition, the perception stack 1312 may determine the free space around the AV 1302 (e.g., to maintain a safe distance from other objects, change lanes, park the AV, etc.). The perception stack 1312 may also identify environmental uncertainties, such as where to look for moving objects, flag areas that may be obscured or blocked from view, and so forth.

Mapping and localization stack 1314 may determine the AV's position and orientation (pose) using different methods from multiple systems (e.g., GPS, IMUs, cameras, LIDAR, RADAR, ultrasonic sensors, the HD geospatial database 1322, etc.). For example, in some embodiments, the AV 1302 may compare sensor data captured in real-time by the sensor systems 1304-1308 to data in the HD geospatial database 1322 to determine its precise (e.g., accurate to the order of a few centimeters or less) position and orientation. The AV 1302 may focus its search based on sensor data from one or more first sensor systems (e.g., GPS) by matching sensor data from one or more second sensor systems (e.g., LIDAR). If the mapping and localization information from one system is unavailable, the AV 1302 may use mapping and localization information from a redundant system and/or from remote data sources.

The planning stack 1316 may determine how to maneuver or operate the AV 1302 safely and efficiently in its environment. For example, the planning stack 1316 may receive the location, speed, and direction of the AV 1302, geospatial data, data regarding objects sharing the road with the AV 1302 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1302 from one point to another. The planning stack 1316 may determine multiple sets of one or more mechanical operations that the AV 1302 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 1316 may select from multiple backup plans to carry out. For example, while preparing to change lanes to turn right at an intersection, another vehicle may aggressively cut into the destination lane, making the lane change unsafe. The planning stack 1316 could have already determined an alternative plan for such an event, and upon its occurrence, help to direct the AV 1302 to go around the block instead of blocking a current lane while waiting for an opening to change lanes.

The control stack 1318 may manage the operation of the vehicle propulsion system 1330, the braking system 1332, the steering system 1334, the safety system 1336, and the cabin system 1338. The control stack 1318 may receive sensor signals from the sensor systems 1304-1308 as well as communicate with other stacks or components of the local computing device 1310 or a remote system (e.g., the data center 1350) to effectuate operation of the AV 1302. For example, the control stack 1318 may implement the final path or actions from the multiple paths or actions provided by the planning stack 1316. Implementation may involve turning the routes and decisions from the planning stack

1316 into commands for the actuators that control the AV's steering, throttle, brake, and drive unit.

The communication stack 1320 may transmit and receive signals between the various stacks and other components of the AV 1302 and between the AV 1302, the data center 1350, the client computing device 1370, and other remote systems. The communication stack 1320 may enable the local computing device 1310 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 1320 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.).

The HD geospatial database 1322 may store HD maps and related data of the streets upon which the AV 1302 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 1324 may store raw AV data generated by the sensor systems 1304-1308 and other components of the AV 1302 and/or data received by the AV 1302 from remote systems (e.g., the data center 1350, the client computing device 1370, etc.). In some embodiments, the raw AV data may include HD LIDAR point cloud data, image or video data, RADAR data, GPS data, and other sensor data that the data center 1350 may use for creating or updating AV geospatial data as discussed further below with respect to FIG. 5 and elsewhere in the present disclosure.

The data center 1350 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1350 may include one or more computing devices remote to the local computing device 1310 for managing a fleet of AVs and AV-related services. For example, in addition to managing the AV 1302, the data center 1350 may also support a ridesharing service, a delivery service, a remote/roadside assistance service, street services (e.g., street mapping, street patrol, street cleaning, street metering, parking reservation, etc.), and the like.

The data center 1350 may send and receive various signals to and from the AV 1302 and the client computing device 1370. These signals may include sensor data captured by the sensor systems 1304-1308, roadside assistance requests, software updates, ridesharing pick-up and drop-off instructions, and so forth. In this example, the data center 1350 includes one or more of a data management platform 1352, an Artificial Intelligence/Machine Learning (AI/ML) platform 1354, a simulation platform 1356, a remote assistance platform 1358, a ridesharing platform 1360, and a map management platform 1362, among other systems.

Data management platform 1352 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1350 may access data stored by the data management platform 1352 to provide their respective services.

The AI/ML platform 1354 may provide the infrastructure for training and evaluating machine learning algorithms for operating the AV 1302, the simulation platform 1356, the remote assistance platform 1358, the ridesharing platform 1360, the map management platform 1362, and other platforms and systems. Using the AI/ML platform 1354, data scientists may prepare data sets from the data management platform 1352; select, design, and train machine learning models; evaluate, refine, and deploy the models; maintain, monitor, and retrain the models; and so on.

The simulation platform 1356 may enable testing and validation of the algorithms, machine learning models, neural networks, and other development efforts for the AV 1302, the remote assistance platform 1358, the ridesharing platform 1360, the map management platform 1362, and other platforms and systems. The simulation platform 1356 may replicate a variety of driving environments and/or reproduce real-world scenarios from data captured by the AV 1302, including rendering geospatial information and road infrastructure (e.g., streets, lanes, crosswalks, traffic lights, stop signs, etc.) obtained from the map management platform 1362; modeling the behavior of other vehicles, bicycles, pedestrians, and other dynamic elements; simulating inclement weather conditions, different traffic scenarios; and so on.

The remote assistance platform 1358 may generate and transmit instructions regarding the operation of the AV 1302. For example, in response to an output of the AI/ML platform 1354 or other system of the data center 1350, the remote assistance platform 1358 may prepare instructions for one or more stacks or other components of the AV 1302.

The ridesharing platform 1360 may interact with a customer of a ridesharing service via a ridesharing application 1372 executing on the client computing device 1370. The client computing device 1370 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 1372. The client computing device 1370 may be a customer's mobile computing device or a computing device integrated with the AV 1302 (e.g., the local computing device 1310). The ridesharing platform 1360 may receive requests to be picked up or dropped off from the ridesharing application 1372 and dispatch the AV 1302 for the trip.

Map management platform 1362 may provide a set of tools for the manipulation and management of geographic and spatial (geospatial) and related attribute data. The data management platform 1352 may receive LIDAR point cloud data, image data (e.g., still image, video, etc.), RADAR data, GPS data, and other sensor data (e.g., raw data) from one or more AVs 1302, Unmanned Aerial Vehicles (UAVs), satellites, third-party mapping services, and other sources of geospatially referenced data. The raw data may be processed, and map management platform 1362 may render base representations (e.g., tiles (2D), bounding volumes (3D), etc.) of the AV geospatial data to enable users to view, query, label, edit, and otherwise interact with the data. Map management platform 1362 may manage workflows and tasks for operating on the AV geospatial data. Map management platform 1362 may control access to the AV geospatial data, including granting or limiting access to the AV geospatial data based on user-based, role-based, group-based, task-based, and other attribute-based access control mechanisms. Map management platform 1362 may provide version control for the AV geospatial data, such as to track specific changes that (human or machine) map editors have made to the data and to revert changes when necessary. Map management platform 1362 may administer release management of the AV geospatial data, including distributing suitable iterations of the data to different users, computing devices, AVs, and other consumers of HD maps. Map management platform 1362 may provide analytics regarding the AV geospatial data and related data, such as to generate insights relating to the throughput and quality of mapping tasks.

In some embodiments, the map viewing services of map management platform 1362 may be modularized and deployed as part of one or more of the platforms and systems of the data center 1350. For example, the AI/ML platform 1354 may incorporate the map viewing services for visualizing the effectiveness of various object detection or object classification models, the simulation platform 1356 may incorporate the map viewing services for recreating and visualizing certain driving scenarios, the remote assistance platform 1358 may incorporate the map viewing services for replaying traffic incidents to facilitate and coordinate aid, the ridesharing platform 1360 may incorporate the map viewing services into the client application 1372 to enable passengers to view the AV 1302 in transit en route to a pick-up or drop-off location, and so on.

Figure 14:
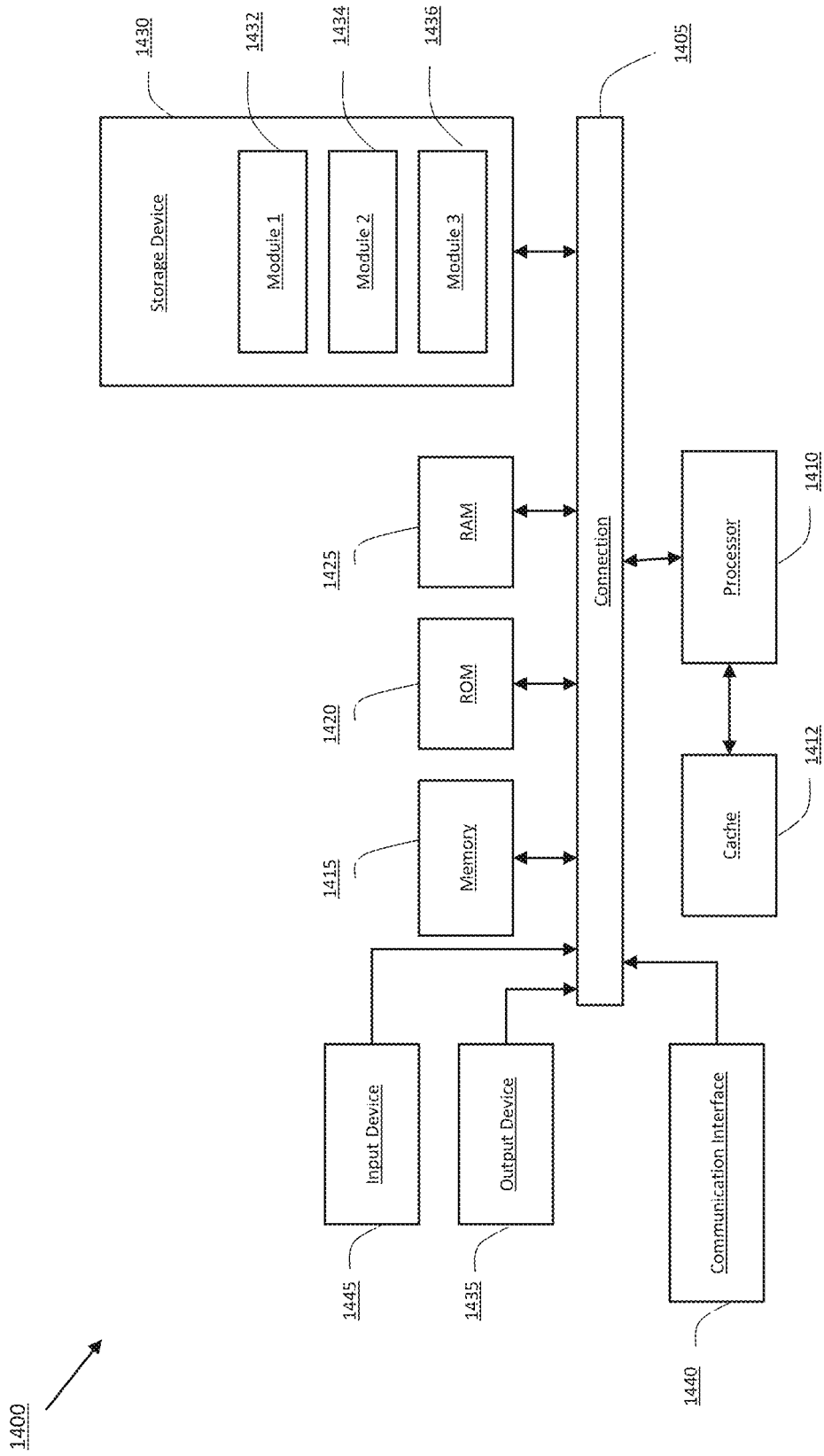
FIG. 14 illustrates an example processor-based system with which some aspects of the subject technology may be implemented.

FIG. 14 illustrates an example processor-based system with which some aspects of the subject technology may be implemented. For example, processor-based system 1400 may be any computing device making up, or any component thereof in which the components of the system are in communication with each other using connection 1405. Connection 1405 may be a physical connection via a bus, or a direct connection into processor 1410, such as in a chipset architecture. Connection 1405 may also be a virtual connection, networked connection, or logical connection.

In some embodiments, computing system 1400 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1400 includes at least one processing unit (Central Processing Unit (CPU) or processor) 1410 and connection 1405 that couples various system components including system memory 1415, such as Read-Only Memory (ROM) 1420 and Random-Access Memory (RAM) 1425 to processor 1410. Computing system 1400 may include a cache of high-speed memory 1412 connected directly with, in close proximity to, or integrated as part of processor 1410.

Processor 1410 may include any general-purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

In some embodiments, processor 1410 can be used to perform the autocorrelation of the Doppler and azimuth spectra and/or the cross correlation between the result and the sensor Doppler and angular point spread functions (PSF). In one or more embodiments, storage device modules, 1432, 1434, and 1436 can be used to store intermediate calculations and/or RADAR data cube information.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms known to those of skill in the art. In some instances, multimodal systems may enable a user to provide multiple types of input/output to communicate with computing system 1400. Computing system 1400 may include communications interface 1440, which may generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1440 may also include one or more GNSS receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer-readable media which may store data that are accessible by a computer, such as magnetic cassettes, flash memory cards, solid-state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1430 may include software services, servers, services, etc., when the code that defines such software is executed by the processor 1410, it causes the system 1400 to perform a function. In some embodiments, a hardware service that performs a particular function may include the software component stored in a computer-readable medium in connection with the necessary hardware components, such as processor 1410, connection 1405, output device 1435, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method comprising sampling RADAR signal received from a plurality of antennae, conditioning the sampled RADAR signals; calculating a range-Doppler map, calculating an angular spectrum based at least on the range-Doppler map, and autocorrelating the angular spectrum with the range-Doppler map.

Example 2 includes a method comprising means for performing the method of any of the examples further comprising down converting the sampled RADAR signals.

Example 3 includes a method comprising means for performing the method of any of the examples further comprising creating a RADAR cube.

Example 4 includes a method comprising means for performing the method of any of the examples further comprising applying a threshold to the range-Doppler map.

Example 5 includes a method comprising means for performing the method of any of the examples, wherein the threshold is adaptive.

Example 6 includes a method comprising means for performing the method of any of the examples further comprising extracting one or more target signatures.

Example 7 includes a method comprising means for performing the method of any of the examples, wherein the angular spectrum comprises azimuth and elevation orientations.

Example 8 provides a method for calibrating an antenna comprising determining a point spread function of the antenna by reflecting RADAR waves off a predetermined target having a characteristic signature, receiving the reflected RADAR waves, extracting the characteristic signatures from the received reflected waves, and decomposing the point spread function from the predetermined target.

Example 10 includes a method comprising means for performing the method of any of the examples further comprising autocorrelating an angular spectrum with a range-Doppler map.

Example 11 includes a method comprising means for performing the method of any of the examples, wherein the autocorrelation produces angular spectrum and range-Doppler matrices.

Example 12 includes a method comprising means for performing the method of any of the examples further comprising cross correlating the angular spectrum and range-Doppler matrices with the extracted point spread function of the antenna.

Example 13 includes a method comprising means for performing the method of any of the examples further comprising conditioning the sampled RADAR signals.

Example 14 includes a method comprising means for performing the method of any of the examples further comprising extracting one or more target signatures.

Example 15 includes a method comprising means for performing the method of any of the examples further comprising thresholding one or more target signatures.

Example 16 provides a method comprising digitizing RADAR signal received from a plurality of antennae, filtering the sampled RADAR signals; calculating a range-Doppler map, calculating an angular spectrum; autocorrelating the angular spectrum with the range-Doppler map, and applying a frequency estimation algorithm.

Example 17 includes a method comprising means for performing the method of any of the examples, wherein the frequency estimation algorithm is a Pisarenko method.

Example 18 includes a method comprising means for performing the method of any of the examples further comprising an angle and velocity estimation.

Example 19 includes a method comprising means for performing the method of any of the examples further comprising populating a point cloud.

Example 20 includes a method comprising means for performing the method of any of the examples further comprising populating a perception stack.

Example 21 includes a method comprising means for performing the method of any of the examples, wherein the perception stack is configured to perform object classification, at least in part.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
    conditioning RADAR signals received from a plurality of antennae;
    sampling the conditioned RADAR signals;
    calculating a range-Doppler map;
    calculating an angular spectrum based at least on the range-Doppler map;
    autocorrelating the angular spectrum with the range-Doppler map, wherein the autocorrelating results in an autocorrelation matrix for each of the angular spectrum and the range-Doppler map;
    acquiring a point spread function of the plurality of antennae;
    cross-correlating the autocorrelation matrices and the point spread function;
    estimating Doppler and angular offsets based on the cross-correlating; and
    determining an angle and a velocity of an object based on the Doppler and angular offsets.

2. The method according to claim 1 further comprising down converting the sampled RADAR signals.

3. The method according to claim 1 further comprising creating a RADAR cube.

4. The method according to claim 1 further comprising applying a threshold to the range-Doppler map.

5. The method according to claim 4, wherein the threshold is adaptive.

6. The method according to claim 5 further comprising extracting one or more target signatures.

7. The method according to claim 1, wherein the angular spectrum comprises azimuth and elevation orientations.

8. A method comprising:
    filtering RADAR signals received from a plurality of antennae;
    sampling the filtered digitized RADAR signals;
    calculating a range-Doppler map;
    calculating an angular spectrum;
    autocorrelating the angular spectrum with the range-Doppler map, wherein the autocorrelating results in an autocorrelation matrix for each of the angular spectrum and the range-Doppler map;
    acquiring a point spread function of the plurality of antennae;
    cross-correlating the autocorrelation matrices and the point spread function; and
    estimating Doppler and angular offsets based on the cross-correlating, the estimating including applying a frequency estimation algorithm.

9. The method according to claim 8, wherein the frequency estimation algorithm is a Pisarenko method.

10. The method according to claim 8, further comprising an angle and velocity estimation.

11. The method according to claim 8 further comprising populating a point cloud.

12. The method according to claim 11 further comprising populating a perception stack.

13. The method according to claim 12, wherein the perception stack is configured to perform object classification, at least in part.

* * * * *